United States Patent
Zeng et al.

(10) Patent No.: US 12,007,662 B1
(45) Date of Patent: Jun. 11, 2024

(54) LIQUID CRYSTAL GRATING AND HOLOGRAPHIC DISPLAY DEVICE

(71) Applicant: Shanghai Tianma Micro-electronics Co., Ltd., Shanghai (CN)

(72) Inventors: Yang Zeng, Shanghai (CN); Feng Lu, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/204,640

(22) Filed: Jun. 1, 2023

(30) Foreign Application Priority Data

Mar. 31, 2023 (CN) .......................... 202310341525.0

(51) Int. Cl.
*G02F 1/29* (2006.01)
*G02B 30/33* (2020.01)

(52) U.S. Cl.
CPC ............... *G02F 1/29* (2013.01); *G02B 30/33* (2020.01); *G02F 2201/30* (2013.01); *G02F 2203/12* (2013.01)

(58) Field of Classification Search
CPC .. G03H 1/268; G03H 1/0005; G03H 2225/22; G03H 2225/52; G03H 1/0443; G03H 2001/2239; G03H 2225/60; G03H 1/2294; G03H 1/02; G03H 2001/0224; G02F 2203/12; G02F 2201/30; G02F 1/29; G02B 30/33
See application file for complete search history.

(56) References Cited

U.S. PATENT DOCUMENTS

| | | | |
|---|---|---|---|
| 2015/0160495 A1* | 6/2015 | Yang ..................... | G06F 3/0443 349/12 |
| 2021/0208471 A1* | 7/2021 | Kroll ..................... | G03H 1/2294 |
| 2022/0091456 A1* | 3/2022 | Uetsuka ............. | G02F 1/133553 |

* cited by examiner

*Primary Examiner* — Mariam Qureshi
(74) *Attorney, Agent, or Firm* — Anova Law Group, PLLC

(57) ABSTRACT

A liquid crystal grating and a holographic display device are provided. The liquid crystal grating includes grating electrode groups. The grating electrode group includes grating electrodes. Operation states of the liquid crystal grating include a first mode and a second mode. In the first mode, a first voltage of a first polarity is provided to the grating electrode, and an average voltage value of the first voltage is |V1|. In the second mode, a second voltage of a second polarity is provided to the grating electrode, and an average voltage value of the second voltage is |V2|, with |V1|<|V2|. In an operation period, light is modulated by the liquid crystal grating to obtain deflected light, the liquid crystal grating is switched between the first mode and the second mode, a quantity of the first mode is N1, and a quantity of the second mode is N2, with N1>N2.

20 Claims, 4 Drawing Sheets

LIQUID CRYSTAL GRATING AND HOLOGRAPHIC DISPLAY DEVICE

CROSS-REFERENCE TO RELATED APPLICATION

This application claims priority of Chinese Patent Application No. 202310341525.0, filed on Mar. 31, 2023, the entire content of which is hereby incorporated by reference.

FIELD OF THE DISCLOSURE

The present disclosure generally relates to the field of holographic display technology and, more particularly, relates to a liquid crystal grating and a holographic display device.

BACKGROUND

Since it is difficult for two-dimensional display to clearly and accurately express three-dimensional (3D) depth information, people have been working on display technology that may display stereoscopic scenes, that is, holographic (3D) display technology.

In existing technology, when a holographic display device is performing 3D image display, a phase and a magnitude of light may be modulated by a spatial light modulator. A left-eye image and a right-eye image may be formed through a liquid crystal grating. In an ideal state, a liquid crystal may respond equally to positive and negative voltages with a same magnitude. However, because of an additional polarization of the liquid crystal due to deformation, the liquid crystal may have different responses to positive and negative voltages with a same magnitude, that is, a phenomenon of electrical deflection may occur. To make the liquid crystal have a same deflection degree when positive and negative voltages are provided, the magnitudes of the positive and negative voltages may be required to be different. However, after long-term operation, the liquid crystal may gather to one side. Accordingly, afterimages may be formed, and display effect may thus be affected.

SUMMARY

One aspect of the present disclosure includes a liquid crystal grating. The liquid crystal grating includes a plurality of grating electrode groups. A grating electrode group of the plurality of grating electrode groups includes a plurality of grating electrodes. Operation states of the liquid crystal grating include a first mode and a second mode. In the first mode, a first voltage of a first polarity is provided to a grating electrode of the plurality of grating electrodes, and for one grating electrode group of the plurality of grating electrode groups, an average voltage value of the first voltage is $|V1|$. In the second mode, a second voltage of a second polarity is provided to the grating electrode, and for one grating electrode group of the plurality of grating electrode groups, an average voltage value of the second voltage is $|V2|$. The first polarity is different from the second polarity, and $|V1|<|V2|$. In an operation period of the liquid crystal grating, light is modulated by the liquid crystal grating to obtain deflected light, the liquid crystal grating is switched between the first mode and the second mode, a quantity of the first mode is N1, and a quantity of the second mode is N2. N1 and N2 are positive integers, and N1>N2.

Another aspect of the present disclosure includes another liquid crystal grating. The liquid crystal grating includes a plurality of grating electrode groups. A grating electrode group of the plurality of grating electrode groups includes a plurality of grating electrodes. Operation states of the liquid crystal grating include a first mode and a second mode. In the first mode, a first voltage of a first polarity is provided to a grating electrode of the plurality of grating electrodes, and for one grating electrode group of the plurality of grating electrode groups, a maximum voltage value of the first voltage is $|V1max|$. In the second mode, a second voltage of a second polarity is provided to the grating electrode, and for one grating electrode group of the plurality of grating electrode groups, a maximum voltage value of the second voltage is $|V2max|$. The first polarity is different from the second polarity, and $|V1max|<|V2max|$. In an operation period of the liquid crystal grating, light is modulated by the liquid crystal grating to obtain deflected light, the liquid crystal grating is switched between the first mode and the second mode, a quantity of the first mode is N1, and a quantity of the second mode is N2. N1 and N2 are positive integers, and N1>N2.

Another aspect of the present disclosure includes a holographic display device. The holographic display device includes a liquid crystal grating. The liquid crystal grating includes a plurality of grating electrode groups. A grating electrode group of the plurality of grating electrode groups includes a plurality of grating electrodes. Operation states of the liquid crystal grating include a first mode and a second mode. In an operation period of the liquid crystal grating, light is modulated by the liquid crystal grating to obtain deflected light, the liquid crystal grating is switched between the first mode and the second mode, a quantity of the first mode is N1, and a quantity of the second mode is N2. N1 and N2 are positive integers, and N1>N2. In the first mode, a first voltage of a first polarity is provided to a grating electrode of the plurality of grating electrodes, and for one grating electrode group of the plurality of grating electrode groups, an average voltage value of the first voltage is $|V1|$, and in the second mode, a second voltage of a second polarity is provided to the grating electrode, and for one grating electrode group of the plurality of grating electrode groups, an average voltage value of the second voltage is $|V2|$, the first polarity is different from the second polarity, and $|V1|<|V2|$; or, in the first mode, a first voltage of a first polarity is provided to a grating electrode of the plurality of grating electrodes, and for one grating electrode group of the plurality of grating electrode groups, a maximum voltage value of the first voltage is $|V1max|$, and in the second mode, a second voltage of a second polarity is provided to the grating electrode, and for one grating electrode group of the plurality of grating electrode groups, a maximum voltage value of the second voltage is $|V2max|$, the first polarity is different from the second polarity, and $|V1max|<|V2max|$.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
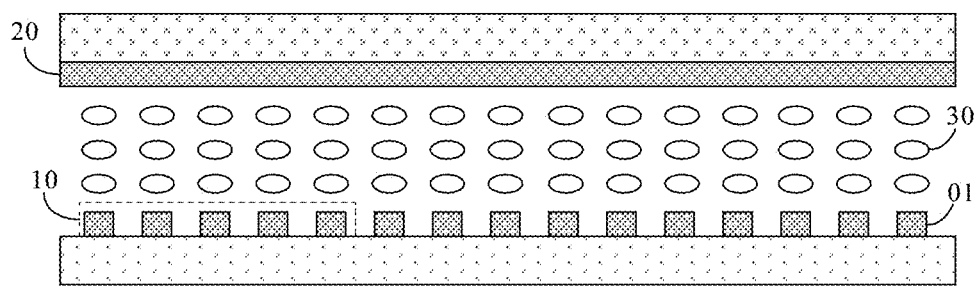
FIG. 1 illustrates a schematic structural diagram of a liquid crystal grating consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, any specific values should be construed as examples only, and not as limitations. Different embodiments may have different values.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

In existing technology, when a holographic display device is performing 3D image display, a phase and a magnitude of light may be modulated by a spatial light modulator. A left-eye image and a right-eye image may be formed through a liquid crystal grating. In an ideal state, a liquid crystal may respond equally to positive and negative voltages with a same magnitude. However, because of an additional polarization of the liquid crystal due to deformation, the liquid crystal may have different responses to positive and negative voltages with a same magnitude, that is, a phenomenon of electrical deflection may occur. To make the liquid crystal have a same deflection degree when positive and negative voltages are provided, the magnitudes of the positive and negative voltages may be required to be different. However, after long-term operation, the liquid crystal may gather to one side. Accordingly, afterimages may be formed, and display effect may thus be affected.

To address the above technical problems, the present disclosure provides a liquid crystal grating. FIG. 1 illustrates a schematic structural diagram of a liquid crystal grating consistent with the disclosed embodiments of the present disclosure. Referring to FIG. 1, the present disclosure provides a liquid crystal grating 100. The liquid crystal grating 100 includes a plurality of grating electrode groups 10. One grating electrode group includes a plurality of grating electrodes 01.

Operation states of the liquid crystal grating 100 include a first mode and a second mode. In the first mode, a first voltage of a first polarity is provided to the grating electrode 01. For one grating electrode group 10, an average voltage value of the first voltage is |V1|. In the second mode, a second voltage of a second polarity is provided to the grating electrode 01. For one grating electrode group 10, an average voltage value of the second voltage is |V2|. The first polarity may be different from the second polarity, and |V1|<|V2|.

In an operation period T of the liquid crystal grating 100, light may be modulated by the liquid crystal grating 100 to obtain deflected light. The liquid crystal grating 100 may be switched between the first mode and the second mode. A quantity of the first mode is N1, and a quantity of the second mode is N2. Here, N1 and N2 are positive integers, with N1>N2.

The liquid crystal grating 100 includes the grating electrode 01 and a common electrode 20 disposed oppositely to the grating electrode 01. A liquid crystal 30 is filled between the common electrode 20 and the grid electrode 01. A common voltage is provided to the common electrode 20, and a driving voltage is provided to the grating electrode 01. An electric field formed by the common electrode 20 and the grating electrode 01 may drive the liquid crystal to deflect. Light incident on the liquid crystal grating 100 may be deflected toward different directions.

In one embodiment of the present disclosure, along a direction parallel to a light exiting surface of the liquid crystal grating 100, the liquid crystal grating 100 includes a plurality of grating electrode groups 10 arranged in sequence. One grating electrode group 10 includes a plurality of grating electrodes 01. Specifically, the first mode refers to providing a voltage of the first polarity to the liquid crystal grating 100, and the second mode refers to providing a voltage of the second polarity to the liquid crystal grating 100. The first polarity and the second polarity may be different. Exemplarily, the first polarity is positive, and the second polarity is negative; or conversely, the first polarity is negative, and the second polarity is positive. Accordingly, the first mode and the second mode indicate that the liquid crystal 30 deflects under an electric field formed by a positive voltage or a negative voltage.

In the first mode, the first voltage of the first polarity is provided to the grating electrodes 01. In a same grating electrode group 10, voltage values of the first voltage to the plurality of grating electrodes 01 may be different. In one embodiment, the plurality of grating electrodes 01 in one grating electrode group 10 are loaded with gradient voltages. For the grating electrode group 10, an average voltage value of the first voltage is |V1|. Similarly, in the second mode, the second voltage of the second polarity is provided to the grating electrodes 01, and the voltage values of the second voltages of the grating electrodes 01 may be different. In a same grating electrode group 10, an average voltage value of the second voltages is |V2|, with |V1|<|V2|.

In one case, deflection directions of the liquid crystal 30 in the first mode and the second mode are same. Due to influences of the electric deflection on the deflection directions of the liquid crystal 30 in the liquid crystal grating 100, when voltages of different polarities are provided to the grating electrodes 01, the magnitudes of the voltages are different. The average voltage value |V1| of the first voltage provided to the grating electrode group 10 in the first mode is smaller than the average voltage value |V2| of the second voltage provided to the grating electrode group 10 in the second mode. In another case, the deflection directions of the liquid crystal 30 in the first mode and the second mode are different, and the deflection angles of the liquid crystal 30 caused by the provided electric fields with different magnitudes may be different. Generally, the average voltage value |V1| of the first voltage provided to the grating electrode group 10 in the first mode is also smaller than the average voltage value |V2| of the second voltage provided to the grating electrode group 10 in the second mode.

The liquid crystal grating 100 has a plurality of operation periods T. In one operation period T, the liquid crystal grating 100 is switched between the first mode and the second mode. The quantity of the first mode is N1, and the quantity of the second mode is N2, where N1>N2. Here, N1 and N2 are positive integers. In the present disclosure, the average voltage values of the voltages in the first mode and the second mode are in a relationship of |V1|<|V2|. Accordingly, the relationship between the quantities of the first mode and the second mode may be set to be N1>N2. In this way, in a complete operation period T of the liquid crystal grating 100, the components of the positive voltage and the negative voltage provided to the liquid crystal grating 100 tend to be same. Accordingly, direct current (DC) balance may be achieved, accumulation of liquid crystals to one side and formation of afterimages may be avoided, and display effect may thus be improved.

It should be noted that the duration of one operation period T of the liquid crystal grating 100 may be set according to actual application scenarios. In one example, each of the durations of the first mode and the second mode is 1 frame, |V1|=2V, and |V2|=3V. One operation period T may be set to be 5 frames. The quantity of the first pattern is 3, and the quantity of the second pattern is 2. In another example, each of the durations of the first mode and the second mode is 1 frame, |V1|=4V, and |V2|=7V. One operation period T may be set to be 11 frames. The quantity of the first mode is 7, and the quantity of the second mode is 4.

In the present disclosure, in one operation period T of the liquid crystal grating 100, the quantities of the first mode and the second mode may be limited. Specifically, in the first mode and the second mode, the polarities of voltages provided to the liquid crystal grating 100 may be different. The average voltage value |V1| of the first voltage provided to the grating electrode group 10 in the first mode may be smaller than the average voltage value |V2| of the second voltage provided to the grating electrode group 10 in the second mode. In one operation period T of the liquid crystal grating 100, the number N1 of the first mode may be greater than the number N2 of the second mode. In this way, within one operation period T, the components of voltages with different polarities may tend to be same, and DC balance may thus be achieved. Accordingly, without changing the original physical structure or circuit structure of the liquid crystal grating 100, afterimages may be avoided, and display effect may be improved.

In another embodiment, |V1|, |V2|, N1, and N2 satisfy:

$$\left| \frac{V1N1}{V2N2} \right| = m$$

where m is a first deviation correction coefficient, with $0.8 \leq m \leq 1.2$. |V1| refers to the average voltage value of the first voltage provided to the liquid crystal grating 100 in the first mode. |V2| refers to the average voltage value of the second voltage provided to the liquid crystal grating 100 in the second mode. N1 refers to the quantity of first modes in one operation period T of the liquid crystal grating 100. N2 refers to the quantity of second modes in one operation period T of the liquid crystal grating 100.

$$\left| \frac{V1N1}{V2N2} \right|$$

may be used to indicate the degree of difference between the first mode and the second mode. Exemplarily, when |V1N1|=2|V2N2|, in the first mode, the product of the average voltage value of the first voltage and the quantity of the first mode is greater than the product of the average voltage value of the second voltage and the quantity of the second mode in the second mode. That is, the bias of the voltage of the first polarity provided to the liquid crystal grating 100 may be greater than the bias of the voltage of the second polarity provided to the liquid crystal grating 100. Long-term operation may lead to DC imbalance.

In the present disclosure, $$\left| \frac{V1N1}{V2N2} \right|$$

is defined as the first deviation correction coefficient m by $$\left| \frac{V1N1}{V2N2} \right| = m,$$

with $0.8 \leq m \leq 1.2$. That is, in one operation period T, $0.8|V2N2| \leq |V1N1| \leq 1.2|V2N2|$. In this way, the difference between |V1N1| and |V2N2| is controlled within a certain range. Since the duration of one operation period T of the liquid crystal grating 100 is set according to an actual application scenario, in $$\left| \frac{V1}{V2} \right| \times \frac{N1}{N2},$$

when |V1| is less than |V2|, N1 is greater than N2. The larger the difference between |V1| and |V2|, the larger the difference between N1 and N2. The smaller the difference between |V1| and |V2|, the smaller the difference between N1 and N2. Exemplarily, when |V1|=3V and |V2|=2V, values of N1 and N3 may be given by N1=3 and N2=2; when |V1|=4V and |V2|=7V, values of N1 and N3 may be given by N1=7 and N2=4.

In one embodiment, the quantitative relationship between |V1|, |V2|, N1, and N2 is determined by $$\left|\frac{V1N1}{V2N2}\right| = m$$

with $0.8 \le m \le 1.2$. In practical applications, |V1| and |V2| may be known, and the ratio of N1 and N2 may be determined according to the value of m. Since N1 and N2 are positive integers, $$\left|\frac{V1N1}{V2N2}\right|$$

gives a numerical range. The closer the first deviation correction coefficient m is to 1, the higher the degree of DC balance of the liquid crystal grating 100 is. The closer the first deviation correction coefficient m is to 0.8 or 1.2, the lower the degree of DC balance of the liquid crystal grating 100 is.

When the first deviation correction coefficient m is less than 0.8 or greater than 1.2, the DC of the liquid crystal grating 100 is unbalanced, and the duration of the operation period T of the liquid crystal grating 100 and the values of N1 and N2 need to be re-determined. The present disclosure limits the quantitative relationship of |V1|, |V2|, N1, and N2, such that when voltages of different polarities are provided to the liquid crystal grating 100, the DC balance may be approached.

In another embodiment, the first deviation correction coefficient m=1. In other words, $$\left|\frac{V1N1}{V2N2}\right| = 1,$$

or |V1N1|=|V2N2|. In this case, the component of the first voltage of the first polarity provided to the liquid crystal grating 100 is same as the component of the second voltage of the second polarity provided to the liquid crystal grating 100. In this way, the DC balance may be achieved within one operation period T of the liquid crystal grating 100, afterimages may be eliminated, and display effect may be improved.

In another embodiment, values of |V1|, |V2|, N1, and N2 satisfy:

$$\left|\frac{V1}{V2} - \frac{N2}{N1}\right| = n$$

where, n is the second deviation correction coefficient, with $n \le 0.5$. |V1| refers to the average voltage value of the first voltage provided to the liquid crystal grating 100 in the first mode. |V2| refers to the average voltage value of the second voltage provided to the liquid crystal grating 100 in the second mode. N1 refers to the quantity of first modes in one operation period T of the liquid crystal grating 100. N2 refers to the quantity of second modes in one operation period T of the liquid crystal grating 100.

$$\left|\frac{V1}{V2} - \frac{N2}{N1}\right|$$

may be used to indicate the degree of difference between the first mode and the second mode. Since |V1|<|V2| and N1>N2, each of $$\left|\frac{V1}{V2}\right|$$

and N2/N1 greater than 0 and less than 1. The smaller the $$\left|\frac{V1}{V2}\right|$$

value, the greater the difference between the average voltage value of the first voltage provided to the liquid crystal grating 100 in the first mode and the average voltage value of the second voltage provided to the liquid crystal grating 100 in the second mode. Accordingly, to compensate the voltage component of the first polarity, the number N1 of the first mode may be required to be greater than the number N2 of the second mode, and N2/N1 may have a positive correlation with $$\left|\frac{V1}{V2}\right|.$$

In one embodiment, $$\left|\frac{V1}{V2} - \frac{N2}{N1}\right| = n,$$

and $n \le 0.5$. In other words, the difference between $$\left|\frac{V1}{V2}\right|$$

and N2/N1 is limited to be within 0.5. In this way, the number N1 of the first mode may compensate for the DC imbalance caused by the average voltage value of the first voltage being smaller than the average voltage value of the second voltage. Simultaneously, the number N2 of the second modes may suppress the DC imbalance caused by the average voltage value of the second voltage being greater than the average voltage value of the first voltage.

In one embodiment, the second deviation correction coefficient n=0. In this case, $$\left|\frac{V1}{V2}\right| = \frac{N2}{N1},$$

that is |V1N1|=|V2N2|. In other words, the component of the first voltage of the first polarity provided to the liquid crystal grating 100 in the first mode is equal to the component of the second voltage of the second polarity provided to the liquid crystal grating 100 in the second mode. Accordingly, DC balance of the liquid crystal grating 100 may be realized, afterimages may be eliminated, and display effect may be improved.

Figure 2:
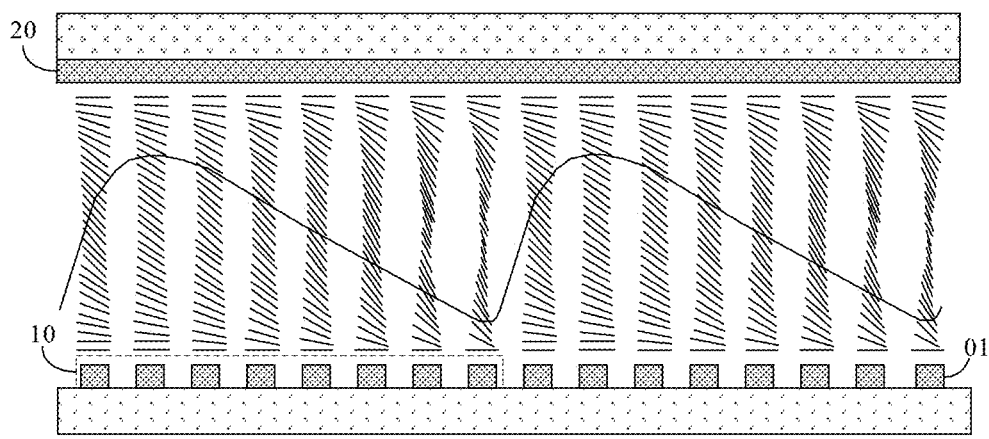
FIG. 2 illustrates a schematic structural diagram of another liquid crystal grating consistent with the disclosed embodiments of the present disclosure.

FIG. 2 illustrates a schematic structural diagram of another liquid crystal grating consistent with the disclosed embodiments of the present disclosure. In one embodiment, referring to FIG. 2, along an arrangement direction of the grating electrodes 01, potential magnitudes of the plurality of grating electrodes 01 in a same grating electrode group 10 increase sequentially. The average voltage of the grating electrode group 10 is an arithmetic mean value of the potential magnitudes of the plurality of grating electrodes 01 included in the grating electrode group 10.

An external electric field formed by the common electrode 20 and the grating electrode 01 may polarize the liquid crystal 30 and drive the liquid crystal 30 to rotate. Generally speaking, the common electrode 20 is an integral plate providing a common voltage. The grating electrode group 10 opposite to the common electrode 20 includes a plurality of grating electrodes 01. The grating electrodes 01 are arranged along a direction parallel to the light exiting surface of the liquid crystal grating 100. The driving of the plurality of grating electrodes 01 is independent of each other. Accordingly, when different driving voltages are provided to different grating electrodes 01, the electric fields formed by the grating electrodes and the common electrode 20 may be different. The deflection angles of the liquid crystal 30 filled between the grating electrodes 01 and the common electrode 20 may also be different.

As a result, along the arrangement direction of the grating electrodes 01, the potential magnitudes of the plurality of grating electrodes 01 in a same grating electrode group 10 increase sequentially. Accordingly, the intensities of the external electric fields formed between the grating electrodes 01 and the common electrode 20 gradually increase. Thus, the deflection angles of the liquid crystals 30 filled between the grating electrodes 01 and the common electrode 20 gradually increase.

For a same grating electrode group 10, the deflection angles of the liquid crystals 30 increase gradually, and the liquid crystals 30 corresponding to the grating electrode group 10 may form a prism structure, and incident light may thus be deflected.

Since the potential magnitudes of a plurality of grating electrodes 01 in a same grating electrode group 10 increase sequentially, the average voltage of the grating electrode group 10 is an arithmetic mean value of the potential magnitudes of the plurality of grating electrodes 01 in the grating electrode group 10. The arithmetic mean value refers to getting a sum by adding the potential magnitudes of the plurality of grating electrodes 01 in the grating electrode group 10, and then dividing the sum by the quantity of the grating electrodes 01. The arithmetic mean value may indicate the average level of the potential of the grating electrode group 10, and may be used to measure the magnitudes of voltages of different polarities provided to the liquid crystal grating 100. The quantities of the first mode and the second mode providing different polarities to the liquid crystal grating 100 may then be designed through the magnitudes of voltages of different polarities.

Whether or not the DC is balanced is determined for the entire liquid crystal grating 100 within a certain length of time. Accordingly, the average voltage of the grating electrode group 10 may be used to indicate the voltage of the grating electrode group 10 at the moment.

In one embodiment, by providing the grating electrodes 01 of a same grating electrode group 10 with gradually increasing potentials, the grating electrode group 10 may form a prism structure, and incident light may thus be deflected. The light deflected toward different directions may form a left-eye image and a right-eye image respectively, holographic display effect may thus be realized.

Figure 3:
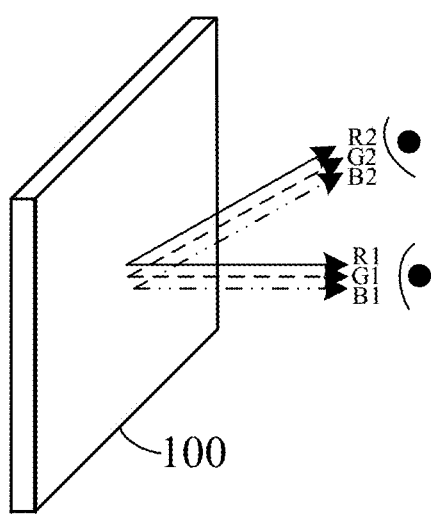
FIG. 3 illustrates an application scene diagram of a liquid crystal grating consistent with the disclosed embodiments of the present disclosure.
Figure 4:
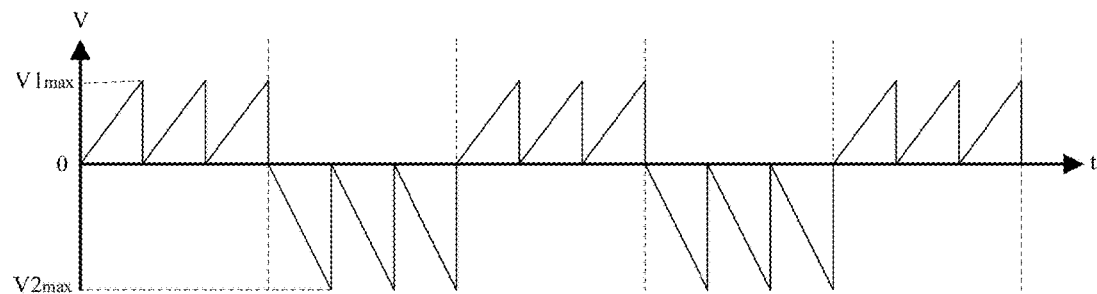
FIG. 4 illustrates a timing diagram of a liquid crystal grating consistent with the disclosed embodiments of the present disclosure.

FIG. 3 illustrates an application scene diagram of a liquid crystal grating consistent with the disclosed embodiments of the present disclosure. FIG. 4 illustrates a timing diagram of a liquid crystal grating consistent with the disclosed embodiments of the present disclosure. Referring to FIGS. 3 and 4, in one embodiment, the operation state of the liquid crystal grating 100 is that the first mode and the second mode are alternately arranged.

In one embodiment, the liquid crystal barrier 100 is switched between the first mode and the second mode. In the first mode, the first voltage of the first polarity is provided to the liquid crystal grating 100. In the second mode, the second voltage of the second polarity is provided to the liquid crystal grid 100.

Referring to FIG. 4, the average voltage value |V1| of the first voltage of the first polarity in the first mode is smaller than the average voltage value |V2| of the second voltage of the second polarity in the second mode. FIG. 4 shows one operation period T of the liquid crystal grating 100. In the operation period T, the quantity of the first mode is three, and the quantity of the second mode is two. The quantitative relationship between the first mode and the second mode is inversely correlated with the average voltage value relationship. A triangle represents a gradient voltage loaded on the grating electrode group. The inclined side of the triangle represents the relative magnitude relationship of the voltage loaded on the grating electrode group, and does not indicate that the voltage magnitude relationship is linear. The horizontal axis may be understood as spatial positions of the grating electrodes. As an example, FIG. 4 shows a liquid crystal grating including three grating electrode groups. In actual applications, depending on specific conditions, the liquid crystal grating may include more grating electrode groups. In each grating electrode group, the quantity of grating electrodes may be same or different. The three grating electrode groups are sequentially loaded with gradient voltages, and the liquid crystal may be deflected under the electric field to modulate the light incident on the liquid crystal grating.

In one operation period T of the liquid crystal grating 100, the first mode and the second mode are alternately arranged. That is, voltages of the first polarity and the second polarity are alternately provided to the liquid crystal grating 100. By alternately arranging voltages of different polarities, DC imbalance in a short period of time caused by excessive accumulation of the component of the voltage of the first polarity or the voltage of the second polarity in a relatively short period of time may be avoided.

It should be noted that the operation period T of the liquid crystal grating 100 may include a plurality of time periods. In one period shown in FIG. 4, a voltage of one polarity is provided to the liquid crystal grating 100. In addition, FIG. 4 only indicates the change trend of the potentials of the plurality of grating electrodes 01 in one grating electrode group 10, and does not represent actual voltage values. For illustration purposes only, a minimum voltage value in FIG. 4 is 0V. In an actual application, the minimum voltage value may be selected according to the actual situation. In addition, for the gradient voltage on one grating electrode group 10, increase and decrease of the voltage magnitude may be non-linear. FIG. 4 only illustrates the magnitude relationship of the voltage, but not a linear relationship of the voltage.

Figure 5:
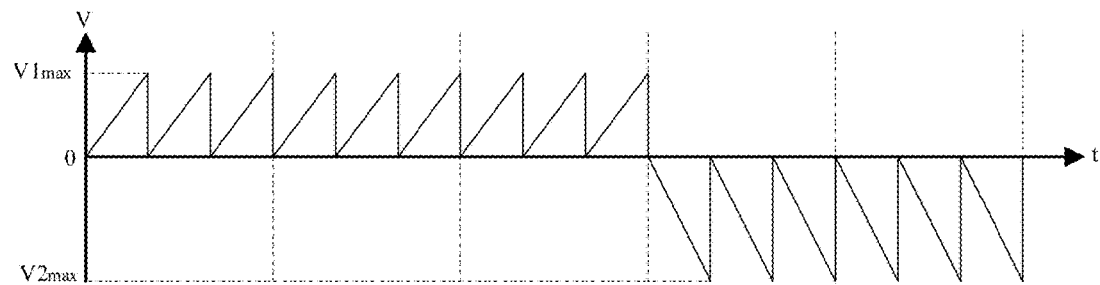
FIG. 5 illustrates another timing diagram of a liquid crystal grating consistent with the disclosed embodiments of the present disclosure.

FIG. 5 illustrates another timing diagram of a liquid crystal grating consistent with the disclosed embodiments of the present disclosure. In one embodiment, referring to FIG. 5, the operation state of the liquid crystal grating 100 is that a plurality of first modes is adjacently arranged, and a plurality of second modes is adjacently arranged.

In one embodiment, the liquid crystal barrier 100 is switched between the first mode and the second mode. In the first mode, the first voltage of the first polarity is provided to the liquid crystal grating 100. In the second mode, the second voltage of the second polarity is provided to the liquid crystal grid 100.

Referring to FIG. 5, the average voltage value |V1| of the first voltage of the first polarity in the first mode is smaller than the average voltage value |V2| of the second voltage of the second polarity in the second mode. FIG. 5 shows one operation period T of the liquid crystal grating 100. In the operation period T, the quantity of the first mode is three, and the quantity of the second mode is two. The quantitative relationship between the first mode and the second mode is inversely correlated with the average voltage value relationship.

In one operation period T of the liquid crystal grating 100, the plurality of first modes is adjacent and the plurality of second modes is adjacent. That is, voltages of a same polarity are provided to the liquid crystal grating 100 within a short period of time. The voltages of the same polarity are arranged in sequence. As such, the times of changing the polarity of the driving voltage may be reduced, and the driving efficiency of the liquid crystal grating 100 may be improved.

It should be noted that the operation period T of the liquid crystal grating 100 may include a plurality of time periods. In one period shown in FIG. 5, a voltage of one polarity is provided to the liquid crystal grating 100. In addition, FIG. 5 only indicates the change trend of the potentials of the plurality of grating electrodes 01 in one grating electrode group 10, and does not represent actual voltage values. For illustration purposes only, a minimum voltage value in FIG. 5 is 0V. In an actual application, the minimum voltage value may be selected according to the actual situation. In addition, for the gradient voltage on one grating electrode group 10, increase and decrease of the voltage magnitude may be non-linear. FIG. 5 only illustrates the magnitude relationship of the voltage, but not a linear relationship of the voltage.

Figure 6:
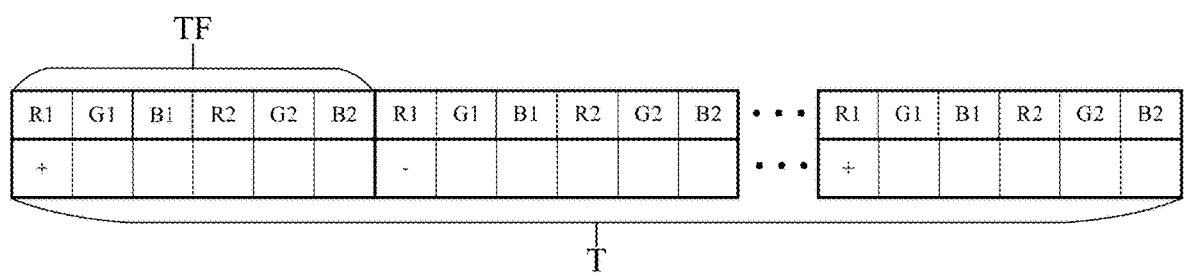
FIG. 6 illustrates another timing diagram of a liquid crystal grating consistent with the disclosed embodiments of the present disclosure.

FIG. 6 illustrates another timing diagram of a liquid crystal grating consistent with the disclosed embodiments of the present disclosure. In one embodiment, referring to FIG. 6, the operation period T includes N display total frames TF with N=N1+N2. The display total frame TF includes at least a first color frame R1. In the first color frame R1, a first type of light is modulated by the liquid crystal grating 100 to obtain first deflected light.

In one operation period T of the liquid crystal grating 100, in at least one first color frame R1, the operation state of the liquid crystal grating 100 is the first mode (denoted by + in FIG. 6), and in at least one first color frame R1, the operation state of the liquid crystal grating 100 is the second mode (denoted by + in FIG. 6).

The operation period T of the liquid crystal grating 100 includes N display total frames TF. The display total frame TF is configured to provide a display image. Specifically, one display image includes a left-eye image and a right-eye image.

The display total frame TF includes at least the first color frame R1. In the first color frame R1, the first type of light is modulated by the liquid crystal grating 100 to obtain the first deflected light. In other words, in the first color frame R1, the luminous colors of the light incident on the liquid crystal grating 100 are consistent, and the deflection directions of the light incident on the liquid crystal grating 100 are consistent. Accordingly, for the first color frames in the plurality of display total frames TF, the deflection degrees of the liquid crystal 30 are same. Exemplarily, the total frame TF includes at least the first red frame. In the first red frame, the liquid crystal grating 100 deflects the incident red light toward the left eye direction.

Due to the phenomenon of electrical deflection, to achieve a same deflection direction of the liquid crystal 30 under voltages with different polarities, magnitudes of the voltages of different polarities are different. That is, the average voltage value |V1| of the first voltage of the first polarity provided to the liquid crystal grating 100 is smaller than the magnitude |V2| of the second voltage of the second polarity provided to the liquid crystal grating 100. In this case, when only the DC balance of the first color frame R1 is considered, in at least one first color frame R1, the operation state of the liquid crystal grating 100 is the first mode, and in at least one first color frame R1, the operation state of the liquid crystal grating 100 is the second mode.

Exemplarily, for deflecting red light toward the left eye direction, when the operation state of the liquid crystal grating 100 is the first mode, the average voltage value of the grating electrode group 10 is |+2.5|V. When the operation state of the liquid crystal grating 100 is the second mode, the average voltage value of the grating electrode group is |−3.5|V. In this way, in the first color frames of the plurality of display total frames TF, the first voltage of the first polarity may exist, and the second voltage of the second polarity may also exist. In addition, the number N1 of the first mode is greater than the number N2 of the second mode. Accordingly, DC imbalance caused by an excessive voltage component of a certain polarity in the first color frame R1 may be avoided, and the display effect may be improved.

Figure 7:
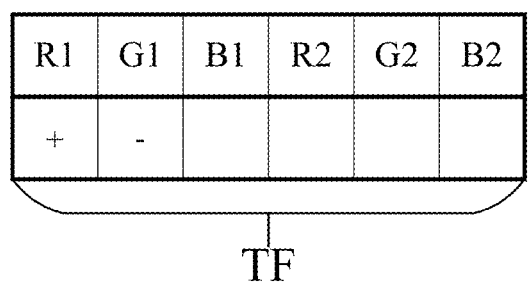
FIG. 7 illustrates another timing diagram of a liquid crystal grating consistent with the disclosed embodiments of the present disclosure.

FIG. 7 illustrates another timing diagram of a liquid crystal grating consistent with the disclosed embodiments of the present disclosure. In one embodiment, referring to FIG. 7, the operation period T includes N display total frames TF, where N=N1+N2. A display total frame TF includes a plurality of subframes (denoted by R1, G1, B1, R2, G2, and B2 in FIG. 7).

In one display total frame TF of the liquid crystal grating 100, in at least one subframe, the operation state of the liquid crystal grating 100 is the first mode (denoted by + in FIG. 7), and in at least one subframe, the operation state of the liquid crystal grating 100 is the second mode (denoted by − in FIG. 7).

One operation period T of the liquid crystal grating 100 includes N display total frames TF. One display total frame TF is used to provide a display image. Specifically, one display image includes a left-eye image and a right-eye image.

It should be noted that the optical three primary colors refer to red, green and blue. Light with luminous colors of red, green and blue may be mixed in different proportions to form a plurality of colors, thereby forming a display image.

The plurality of subframes included in one display total frame TF may modulate light of different colors, or modulate light toward different angles. Exemplarily, the display total frame TF includes 6 subframes, namely a first red frame R1, a first green frame G1, a first blue frame B1, a second red frame R2, a second green frame G2 and a second blue frame B2. In the first red frame R1, the liquid crystal grating 100 deflects the incident red light toward the left eye direction. Similarly, in the first green frame G1 and the first blue frame B1, the liquid crystal grating 100 deflects the incident green light or blue light toward the left eye direction. The red light, the green light and the blue light deflected toward the left eye direction by the liquid crystal grating 100 may form a left eye image. In the second red frame R2, the liquid crystal grating 100 deflects the incident red light toward the right eye direction. In the second green frame G2 and the second blue frame B2, the liquid crystal grating 100 deflects the incident green light or blue light toward the right eye direction. The red light, the green light and the blue light deflected toward the right eye direction by the liquid crystal grating 100 may form a right eye image.

Generally speaking, for light rays with different luminous colors, the magnitudes of the voltages to achieve a same deflection direction may not be completely same. Accordingly, in any two subframes of one display total frame TF, no matter whether the luminous color of the light modulated by the liquid crystal grating 100 is same, or whether the angle of the deflected light is same, the average voltage values of the voltages driving the two subframes may be different.

In one embodiment, among the plurality of subframes included in the display total frame TF, in at least one subframe, the operation state of the liquid crystal grating 100 is the first mode, and in at least one subframe, the operation state of the liquid crystal grating 100 is the second mode. In this way, in the display total frame TF, the first voltage of the first polarity and the second voltage of the second polarity may each exist. Moreover, the number N1 of the first mode is greater than the number N2 of the second mode. Accordingly, the DC imbalance caused by the excessive voltage component of a certain polarity in one display total frame TF may be avoided, and the display effect may be improved.

Figure 8:
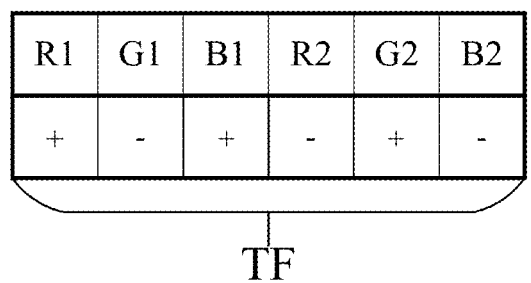
FIG. 8 illustrates another timing diagram of a liquid crystal grating consistent with the disclosed embodiments of the present disclosure.
Figure 9:
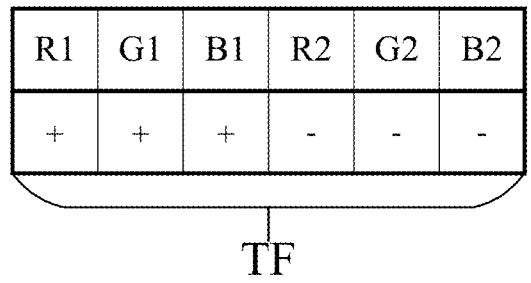
FIG. 9 illustrates another timing diagram of a liquid crystal grating consistent with the disclosed embodiments of the present disclosure.

FIG. 8 illustrates another timing diagram of a liquid crystal grating consistent with the disclosed embodiments of the present disclosure. FIG. 9 illustrates another timing diagram of a liquid crystal grating consistent with the disclosed embodiments of the present disclosure. In one embodiment, the display total frame TF includes M subframes (denoted by R1, G1, B1, R2, G2, and B2 in FIG. 8 and FIG. 9), and M is a positive integer. The quantity of subframes in which the operation state of the liquid crystal grating 100 is the first mode (denoted by + in FIGS. 8 and 9) is M1, and the quantity of subframes in which the operation state of the liquid crystal grating 100 is the second mode (denoted by − in FIGS. 8 and 9) is M2, with M1=M2.

One display total frame TF includes M subframes, and the M subframes are arranged in sequence. In one embodiment, the number M1 of subframes in which the operation state of the liquid crystal grating 100 is the first mode is equal to the number M2 of subframes in which the operation state of the liquid crystal grating 100 is the second mode. That is, in one display total frame TF, the times of supplying the voltage of the first polarity to the liquid crystal grating 100 is equal to the times of supplying the voltage of the second polarity to the liquid crystal grating 100. The plurality of first modes and the plurality of second modes in the display total frame TF may be alternately arranged in the plurality of subframes as shown in FIG. 8. Alternatively, as shown in FIG. 9, the plurality of first modes is adjacently arranged, and the plurality of second modes is adjacently arranged.

In one embodiment, in one display total frame TF, the quantity of the first modes is equal to the quantity of the second modes. The DC balance may be adjusted in one display total frame TF. Voltages of different polarities may appear sequentially or alternately. DC imbalance caused by an excessive voltage component of a certain polarity in the display total frame TF may be avoided, and the display effect may be improved.

Figure 10:
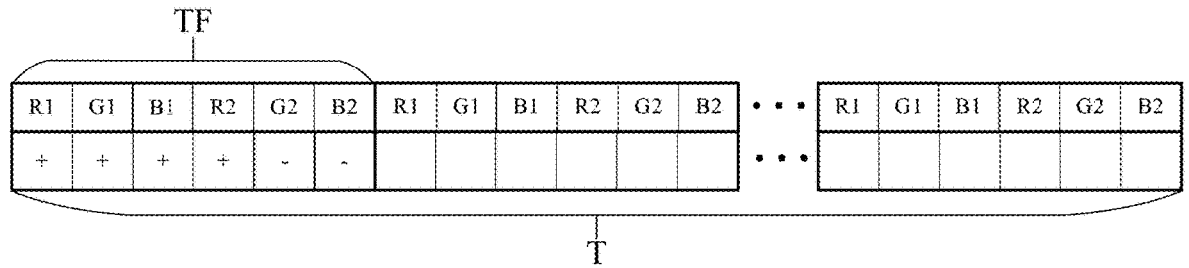
FIG. 10 illustrates another timing diagram of a liquid crystal grating consistent with the disclosed embodiments of the present disclosure.

FIG. 10 illustrates another timing diagram of a liquid crystal grating consistent with the disclosed embodiments of the present disclosure. In one embodiment, the display total frame TF includes M subframes (denoted by R1, G1, B1, R2, G2, and B2 in FIG. 10), and M is a positive integer. The quantity of subframes in which the operation state of the liquid crystal grating 100 is the first mode (denoted by + in FIG. 10) is M1, and the quantity of subframes in which the operation state of the liquid crystal grating 100 is the second mode (denoted by − in FIG. 10) is M2, with M1>M2.

In different subframes of one display total frame TF, the liquid crystal grating 100 deflects incident light rays of different colors toward different angles. When light rays with different colors are modulated or light rays are modulated toward different angles, the deflection angles of the liquid crystal 30 may not be completely same. Exemplarily, when the liquid crystal grating 100 deflects incident red light, green light and blue light toward the left eye, the voltage provided to the liquid crystal grating 100 when deflecting the red light is greater than the voltage provided to the liquid crystal grating 100 when deflecting green light or blue light.

As such, in a same display total frame TF, the number M1 of subframes in which the operation state of the liquid crystal grating 100 is the first mode is greater than the number M2 of subframes in which the operation state of the liquid crystal grating 100 is the second mode. The subframe in which the operation state of the liquid crystal grating 100 is the first mode may be one or a plurality of subframes in which the average voltage value of the grating electrode group 10 is relatively small. The subframe in which the operation state of the liquid crystal grating 100 is the second mode may be one or a plurality of subframes in which the average voltage value of the grating electrode group 10 is relatively large. In this way, in one display total frame TF, the DC imbalance caused by the excessive voltage component of a certain polarity may be avoided, and the display effect may be improved.

In one display total frame TF, the quantity of subframes in which the operation state is the first mode or the second mode should also be considered from the whole operation period T of the liquid crystal grating 100. In one embodiment, the number M1 of subframes in which the operation state of the liquid crystal grating 100 is the first mode is greater than the quantity of subframes M2 in which the operation state of the liquid crystal grating 100 is the second mode. In this way, the DC balance of one display total frame TF may be adjusted, and the DC balance of one operation period T may be adjusted. The display effect may thus be improved.

Still referring to FIG. 7, in one embodiment, the subframe includes a first subframe R1 and a second subframe G1. The operation state of the liquid crystal grating 100 in the first subframe R1 is the first mode, and the operation state of the liquid crystal grating 100 in the second subframe R2 is the second mode. The first subframe R1 is configured for modulating a first type of light, and the second subframe R2 is configured for modulating a second type of light. Colors of the first type of light and the second type of light may be different.

The subframe includes a first subframe R1 and a second subframe G1. The first subframe R1 is configured for modulating the first type of light, and the second subframe G1 is configured for modulating the second type of light. Colors of the first type of light and the second type of light may be different. Exemplarily, the first type of light is red light, and the second type of light is green light. In the first subframe R1, the voltage provided to the liquid crystal grating 100 is adapted to the magnitude for deflecting the red light. In the second subframe G1, the voltage provided to the liquid crystal grating 100 is adapted to the magnitude for deflecting the green light.

In the first subframe R1, the operation state of the liquid crystal grating 100 is the first mode. In the second subframe G1, the operation state of the liquid crystal grating 100 is the second mode. That is, in subframes that modulate light of different colors, the operation states of the liquid crystal grating 100 may be different.

In one embodiment, in the subframes for modulating light of different colors, the operation state of the liquid crystal grating 100 at least in the first subframe R1 is the first mode, and the operation state of the liquid crystal grating 100 at least in the second subframe G1 is the second mode. In this way, in the same display total frame TF, the first voltage of the first polarity and the second voltage of the second polarity each may be provided to the liquid crystal grating 100. Moreover, when the liquid crystal grating 100 modulates light of different colors, the voltage magnitudes required may be different. Accordingly, in one embodiment, the quantity of operation states of the subframes that modulate light of different colors in a display total frame TF may be adjusted, and the DC balance of the liquid crystal grating 100 may thus be achieved.

In another embodiment, the first subframe R1 is configured for modulating the first color light, and the second subframe G1 is configured for modulating the second color light. The wavelength of the first color light is smaller than the wavelength of the second color light.

In the first subframe R1 and the second subframe G1, the liquid crystal grating 100 modulates the first color light and the second color light respectively. The wavelength of the first color light is smaller than the wavelength of the second color light. For example, the first color light is green light with a wavelength in a range of approximately 492 nm to 577 nm, and the second color light is red light with a wavelength in a range of approximately 622 nm to 760 nm. In this case, the wavelength of the first color light is smaller than the wavelength of the second color light. For another example, the first color light is blue light with a wavelength in a range of approximately 400 nm to 450 nm, and the second color light is green light with a wavelength in a range of approximately 492 nm to 577 nm. In this case, the wavelength of the first color light is also smaller than the wavelength of the second color light.

When the liquid crystal grating 100 modulates light rays of different wavelengths (colors) and the light rays have a same deflection angle, the liquid crystals 30 in the liquid crystal grating 100 may have different deflection angles to form different prism structures. As such, for light rays of different wavelengths (colors), the voltages provided to the liquid crystal grating 100 may be different. Accordingly, in one embodiment, the quantity of operation states of the subframes in the liquid crystal grating 100 that modulate light of different wavelengths (colors) may be adjusted, and the DC balance of the liquid crystal grating 100 may thus be achieved.

Still referring to FIG. 8, in one embodiment, the subframes include a third subframe B1 and a fourth subframe B2. The operation state of the liquid crystal grating in the third subframe B1 is the first mode, and the operation state of the liquid crystal grating 100 in the fourth subframe B2 is the second mode. The third subframe B1 is configured for modulating the third type of light, and the fourth subframe B2 is configured for modulating the fourth type of light. The third type of light and the fourth type of light have a same color and different deflection angles.

The subframes include the third subframe B1 and the fourth subframe B2. The third subframe B1 is configured for modulating the third type of light, and the fourth subframe B2 is configured for modulating the fourth type of light. The third type of light and the fourth type of light have a same color and different deflection angles. Exemplarily, the third type of light is blue light, and is deflected toward the left eye direction. The fourth type of light is the blue light, and is deflected toward the right eye direction. In the third subframe B1, the voltage provided to the liquid crystal grating 100 is adapted to the magnitude for deflecting the blue light to the left eye direction. In the fourth subframe B2, the voltage provided to the liquid crystal grating 100 is adapted to the magnitude for deflecting the blue light to the right eye.

In the third subframe B1, the operation state of the liquid crystal grating 100 is the first mode. In the fourth subframe B2, the operation state of the liquid crystal grating 100 is the second mode. That is, in subframes in which light of same color is modulated with different deflection angles, the operation states of the liquid crystal grating 100 may be different.

In one embodiment, in the subframes in which light rays are modulated with different deflection directions, the operation state of the liquid crystal grating 100 at least in the third subframe B1 is the first mode, and the operation state of the liquid crystal grating 100 at least in the fourth subframe B2 is the second mode. In this way, in a same display total frame TF, the first voltage of the first polarity and the second voltage of the second polarity may each be provided to the liquid crystal grating 100. In addition, when the liquid crystal grating 100 modulates light rays with different deflection directions, the required voltage magnitudes may be different. Accordingly, in one embodiment, the quantity of the operation states of the subframes modulating light with different deflection directions in one display total frame TF may be adjusted, and the DC balance of the liquid crystal grating 100 may thus be achieved.

Figure 11:
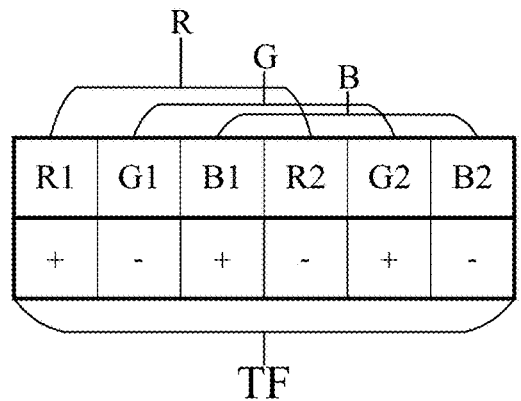
FIG. 11 illustrates another timing diagram of a liquid crystal grating consistent with the disclosed embodiments of the present disclosure.

FIG. 11 illustrates another timing diagram of a liquid crystal grating consistent with the disclosed embodiments of the present disclosure. In another embodiment, referring to FIGS. 3 and 11, the display total frame TF includes a first color frame R, a second color frame G and a third color frame B that modulate light of different colors. The first color frame R includes two subframes, the second color frame G includes two subframes, and the third color frame B includes two subframes.

In one embodiment, the display total frame TF includes the first color frame R, the second color frame G, and the third color frame B. In the first color frame R, the second color frame G, and the third color frame B, colors of light modulated by the liquid crystal grating 100 may be different. Exemplarily, in the first color frame R, the liquid crystal grating 100 modulates red light. In the second color frame G, the liquid crystal grating 100 modulates green light. In the third color frame B, the liquid crystal grating 100 modulates blue light.

Each of the first color frame R, the second color frame G and the third color frame B includes two subframes. In the two subframes of a same color frame, the liquid crystal grating 100 respectively modulates the light of same color toward different deflection directions. Exemplarily, the first color frame R includes a first color subframe R1 and a second color subframe R2. In the first color subframe R1, the liquid crystal grating 100 modulates red light to deflect toward the left eye direction. In the second color subframe R2, the liquid crystal grating 100 modulates the red light to deflect toward the right eye direction. Similarly, the second color frame G includes a third color subframe G1 and a fourth color subframe G2. The third color frame B includes a fifth color subframe B1 and a sixth color subframe B2. In the third color subframe G1, the liquid crystal grating 100 modulates the green light to deflect toward the left eye direction. In the fourth color subframe G2, the liquid crystal grating 100 modulates the green light to deflect toward the right eye direction. In the fifth color subframe B1, the liquid crystal grating 100 modulates the blue light to deflect toward the left eye direction. In the sixth color subframe B2, the liquid crystal grating 100 modulates the blue light to deflect toward the right eye direction. The red light, the green light and the blue light modulated in the first color subframe R1, the third color subframe G1 and the fifth color subframe B1 and deflecting toward the left eye direction form a left-eye image. The red light, the green light and the blue light modulated in the second color subframe R2, the fourth color subframe G2 and the sixth color subframe B2 and deflecting toward the right eye direction form a right-eye image.

In one embodiment, one display total frame TF includes at least 6 subframes (denoted by R1, G1, B1, R2, G2, and B2 in FIG. 11). In the six subframes, the colors or deflection directions of the light rays modulated by the liquid crystal grating 100 may be different. Light rays of different colors or different deflection directions form left-eye images and right-eye images, and holographic display may thus be realized.

In another embodiment, still referring to FIG. 11, in the two subframes included in the first color frame R, the operation states of the liquid crystal grating 100 are the first mode and the second mode respectively.

In the two subframes included in the first color frame R, that is, in the two subframes in which the liquid crystal grating 100 modulates light of same color toward different deflection directions, the operation states of the liquid crystal grating 100 are the first mode and the second mode respectively.

In the two subframes of the first color frame, the operation states of the liquid crystal grating 100 are the first mode and the second mode respectively. In one embodiment, when the modulated light deflects toward the left eye direction, the operation state of the liquid crystal grating 100 is the first mode. When the modulated light deflects toward the right eye direction, the operation state of the liquid crystal grating 100 is the second mode. In another embodiment, when the modulated light deflects toward the right eye direction, the operation state of the liquid crystal grating 100 is the first mode. When the modulated light deflects toward the left eye direction, the operation state of the liquid crystal grating 100 is the second mode.

In one embodiment, in the first color frame R, the first voltage of the first polarity is provided to the liquid crystal grating 100, and the second voltage of the second polarity is also provided to the liquid crystal grating 100. In this way, the direct current of the liquid crystal grating 100 may approach balance.

In one embodiment, the first polarity is positive polarity, and the second polarity is negative polarity. In a process of adjusting the quantity of the operation states of the liquid crystal grating 100, the components of the positive voltage and the negative voltage may be close to same. Accordingly, DC unbalance in the liquid crystal grating 100 due to an excessive voltage component of a certain polarity may be avoided, and the display effect may thus be improved.

Still referring to FIGS. 1 and 3, the present disclosure also provides another liquid crystal grating 100. The liquid crystal grating 100 includes a plurality of grating electrode groups 10, and one grating electrode group 10 includes a plurality of grating electrodes 01. Operation states of the liquid crystal grating 100 includes a first mode and a second mode.

In the first mode, a first voltage of a first polarity is provided to the grating electrode 01. For one grating electrode group 10, a maximum voltage value of the first voltage is $|V1max|$. In the second mode, a second voltage of a second polarity is provided to the grating electrode 01. For one grating electrode group 10, a maximum voltage value of the second voltage is $|V2max|$. The first polarity is different from the second polarity, and $|V1max|<|V2max|$.

In an operation period T of the liquid crystal grating 100, light may be modulated by the liquid crystal grating 100 to obtain deflected light. The liquid crystal grating 100 may be switched between the first mode and the second mode. A quantity of the first mode is N1, and a quantity of the second mode is N2. Here, N1 and N2 are positive integers, with N1>N2.

In the liquid crystal grating 100, magnitudes of the voltage of the first polarity and the voltage of the second polarity may be represented by the maximum voltage value $|V1max|$ of the first voltage and the maximum voltage value $|V2max|$ of the second voltage. To make the liquid crystal grating 100 achieve DC balance during long-term operation, a quantitative relationship between the first mode in which the first voltage of the first polarity is provided to the liquid crystal grating 100 and the second mode in which the second voltage of the second polarity is provided to the liquid crystal grating 100 may be determined, according to the magnitudes of the voltage of the first polarity and the voltage of the second polarity. Since $|V1max|<|V2max|$, the number N1 of the first mode may be greater than the number N2 of the second mode. The quantitative relationship between the first mode and the second mode is inversely correlated with the relationship between the maximum values of the first voltage in the first mode and the second voltage in the second mode. In this way, the voltage components of the first polarity and the voltage component of the second polarity may approach balance, and display effect may thus be improved.

Figure 12:
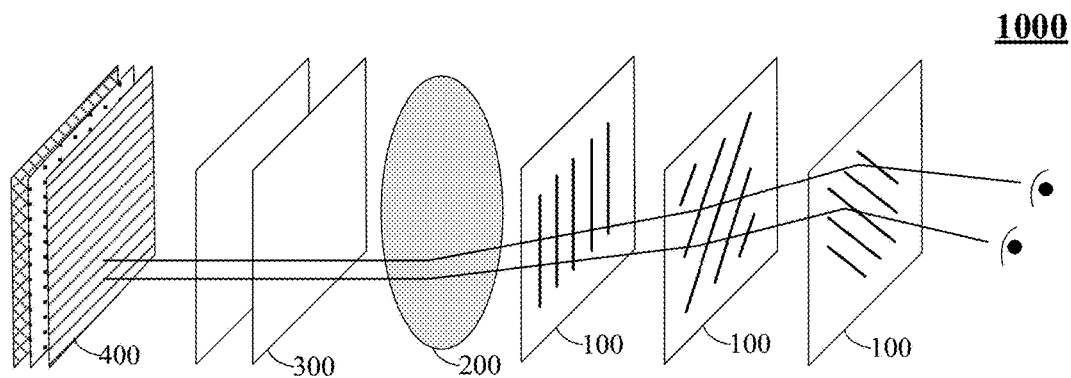
FIG. 12 illustrates a schematic structural diagram of a holographic display device consistent with the disclosed embodiments of the present disclosure.

The present disclosure also provides a holographic display device. FIG. 12 illustrates a schematic structural diagram of a holographic display device consistent with the disclosed embodiments of the present disclosure. Referring to FIG. 12, the holographic display device 1000 includes a liquid crystal grating 100 provided by the present disclosure. The holographic display device 1000 also includes a field lens 200, a spatial light modulator 300 and a backlight source 400. The spatial light modulator 300, the field lens 200 and the liquid crystal grating 100 are sequentially disposed on a side of a light exiting surface of the backlight source 400. One holographic display device 1000 may include one liquid crystal grating 100, or a plurality of liquid crystal gratings.

As disclosed, the technical solutions of the present disclosure have the following advantages.

In the present disclosure, in one operation period T of the liquid crystal grating 100, the quantities of the first mode and the second mode may be limited. Specifically, in the first mode and the second mode, the polarities of the voltages provided to the liquid crystal grating may be different. The average voltage value $|V1|$ of the first voltage provided to the grating electrode group in the first mode may be smaller than the average voltage value $|V2|$ of the second voltage provided to the grating electrode group in the second mode. In one operation period T of the liquid crystal grating, the number N1 of the first mode may be greater than the number N2 of the second mode. In this way, within one operation period T, the components of voltages with different polarities may tend to be same, and DC balance may thus be achieved. Accordingly, without changing the original physical structure or circuit structure of the liquid crystal grating, afterimages may be avoided, and display effect may be improved.

The embodiments disclosed herein are exemplary only and not limiting the scope of the present disclosure. Various combinations, modifications, alternations, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A liquid crystal grating, comprising a plurality of grating electrode groups, wherein:
   a grating electrode group of the plurality of grating electrode groups includes a plurality of grating electrodes;
   operation states of the liquid crystal grating include a first mode and a second mode;
   in the first mode, a first voltage of a first polarity is provided to a grating electrode of the plurality of grating electrodes, and for one grating electrode group of the plurality of grating electrode groups, an average voltage value of the first voltage is |V1|;
   in the second mode, a second voltage of a second polarity is provided to the grating electrode, and for one grating electrode group of the plurality of grating electrode groups, an average voltage value of the second voltage is |V2|, wherein the first polarity is different from the second polarity, and |V1|<|V2|; and
   in an operation period of the liquid crystal grating, light is modulated by the liquid crystal grating to obtain deflected light, the liquid crystal grating is switched between the first mode and the second mode, a quantity of the first mode is N1, and a quantity of the second mode is N2, wherein, N1 and N2 are positive integers, and N1>N2.

2. The liquid crystal grating according to claim 1, wherein:
   |V1|, |V2|, N1, and N2 satisfy:

$$\left|\frac{V1N1}{V2N2}\right| = m,$$

wherein m is a first deviation correction coefficient, and 0.8≤m≤1.2.

3. The liquid crystal grating according to claim 2, wherein the first deviation correction coefficient m=1.

4. The liquid crystal grating according to claim 1, wherein:
   |V1|, |V2|, N1, and N2 satisfy:

$$\left|\frac{V1}{V2} - \frac{N2}{N1}\right| = n,$$

wherein n is a second deviation correction coefficient, and n≤0.5.

5. The liquid crystal grating according to claim 1, wherein:
   along an arrangement direction of the grating electrodes, potential magnitudes of the plurality of grating electrodes in a same grating electrode group of the plurality of grating electrode groups increase sequentially; and
   the average voltage of the grating electrode group is an arithmetic mean value of the potential magnitudes of the plurality of grating electrodes included in the grating electrode group.

6. The liquid crystal grating according to claim 1, wherein:
   the operation state of the liquid crystal grating is that the first mode and the second mode are alternately arranged.

7. The liquid crystal grating according to claim 1, wherein:
   the operation state of the liquid crystal grating is that a plurality of the first modes is adjacently arranged, and a plurality of the second modes is adjacently arranged.

8. The liquid crystal grating according to claim 1, wherein:
   the operation period includes N display total frames, wherein N=N1+N2, and the display total frame includes at least a first color frame;
   in the first color frame, a first type of light is modulated by the liquid crystal grating to obtain first deflected light; and
   in one operation period of the liquid crystal grating, in at least one of the first color frame, the operation state of the liquid crystal grating is the first mode, and in at least one of the first color frame, the operation state of the liquid crystal grating is the second mode.

9. The liquid crystal grating according to claim 1, wherein:
   the operation period includes N display total frames, wherein N=N1+N2, and one display total frame of the N display total frames includes a plurality of subframes; and
   in one display total frame of the liquid crystal grating, in at least one subframe of the plurality of subframes, the operation state of the liquid crystal grating is the first mode, and in at least one subframe of the plurality of subframes, the operation state of the liquid crystal grating is the second mode.

10. The liquid crystal grating according to claim 9, wherein:
    the display total frame includes M subframes, wherein M is a positive integer; and
    a quantity of the subframes in which the operation state of the liquid crystal grating is the first mode is M1, and a quantity of the subframes in which the operation state of the liquid crystal grating is the second mode is M2, wherein M1=M2.

11. The liquid crystal grating according to claim 9, wherein:
    the display total frame includes M subframes, wherein M is a positive integer; and
    a quantity of the subframes in which the operation state of the liquid crystal grating is the first mode is M1, and a quantity of subframes in which the operation state of the liquid crystal grating is the second mode is M2, wherein M1>M2.

12. The liquid crystal grating according to claim 9, wherein:
    the subframe includes a first subframe and a second subframe;

the operation state of the liquid crystal grating in the first subframe is the first mode, and the operation state of the liquid crystal grating in the second subframe is the second mode; and the first subframe is configured for modulating a first type of light, and the second subframe is configured for modulating a second type of light, wherein colors of the first type of light and the second type of light are different.

13. The liquid crystal grating according to claim 12, wherein:

the first subframe is configured for modulating the first color light, and the second subframe is configured for modulating the second color light, wherein a wavelength of the first color light is smaller than a wavelength of the second color light.

14. The liquid crystal grating according to claim 9, wherein:

the subframe includes a third subframe and a fourth subframe;

the operation state of the liquid crystal grating in the third subframe is the first mode, and the operation state of the liquid crystal grating in the fourth subframe is the second mode; and the third subframe is configured for modulating a third type of light, and the fourth subframe is configured for modulating a fourth type of light, wherein the third type of light and the fourth type of light have a same color and different deflection angles.

15. The liquid crystal grating according to claim 9, wherein:

the display total frame includes a first color frame, a second color frame and a third color frame that modulate light of different colors; and the first color frame includes two subframes, the second color frame includes two subframes, and the third color frame includes two subframes.

16. The liquid crystal grating according to claim 15, wherein:

in the two subframes included in the first color frame, the operation states of the liquid crystal grating are the first mode and the second mode respectively.

17. The liquid crystal grating according to claim 1, wherein:

the first polarity is positive polarity, and the second polarity is negative polarity.

18. The liquid crystal grating according to claim 1, in the first mode, a first voltage of a first polarity is provided to a grating electrode of the plurality of grating electrodes, and for one grating electrode group of the plurality of grating electrode groups, a maximum voltage value of the first voltage is |V1max|; and in the second mode, a second voltage of a second polarity is provided to the grating electrode, and for one grating electrode group of the plurality of grating electrode groups, a maximum voltage value of the second voltage is |V2max|, wherein the first polarity is different from the second polarity, and |V1max|<|V2max|.

19. A holographic display device, comprising a liquid crystal grating, wherein the liquid crystal grating includes a plurality of grating electrode groups, wherein:

a grating electrode group of the plurality of grating electrode groups includes a plurality of grating electrodes;

operation states of the liquid crystal grating include a first mode and a second mode;

in an operation period of the liquid crystal grating, light is modulated by the liquid crystal grating to obtain deflected light, the liquid crystal grating is switched between the first mode and the second mode, a quantity of the first mode is N1, and a quantity of the second mode is N2, wherein, N1 and N2 are positive integers, and N1>N2; and in the first mode, a first voltage of a first polarity is provided to a grating electrode of the plurality of grating electrodes, and for one grating electrode group of the plurality of grating electrode groups, an average voltage value of the first voltage is |V1|, and in the second mode, a second voltage of a second polarity is provided to the grating electrode, and for one grating electrode group of the plurality of grating electrode groups, an average voltage value of the second voltage is |V2|, wherein the first polarity is different from the second polarity, and |V1|<|V2|; or, in the first mode, a first voltage of a first polarity is provided to a grating electrode of the plurality of grating electrodes, and for one grating electrode group of the plurality of grating electrode groups, a maximum voltage value of the first voltage is |V1max|, and in the second mode, a second voltage of a second polarity is provided to the grating electrode, and for one grating electrode group of the plurality of grating electrode groups, a maximum voltage value of the second voltage is |V2max|, wherein the first polarity is different from the second polarity, and |V1max|<|V2max|.

20. The holographic display device according to claim 19, further comprising:

a field lens, a spatial light modulator, and a backlight source, wherein the spatial light modulator, the field lens, and the liquid crystal grating are sequentially disposed on a side of a light exiting surface of the backlight source.

* * * * *